United States Patent
Ibuki et al.

(10) Patent No.: US 10,372,094 B2
(45) Date of Patent: Aug. 6, 2019

(54) MOTOR CONTROL DEVICE AND GAME MACHINE

(71) Applicant: OMRON Corporation, Kyoto-shi, Kyoto (JP)

(72) Inventors: Hiroyuki Ibuki, Ichinomiya (JP); Akihiro Ishii, Ichinomiya (JP)

(73) Assignee: OMRON Corporation, Kyoto-shi (JP)

(*) Notice: Subject to any disclaimer, the term of this patent is extended or adjusted under 35 U.S.C. 154(b) by 11 days.

(21) Appl. No.: 15/652,291

(22) Filed: Jul. 18, 2017

(65) Prior Publication Data

US 2018/0046157 A1 Feb. 15, 2018

(30) Foreign Application Priority Data

Aug. 12, 2016 (JP) ................................. 2016-158517

(51) Int. Cl.
| | |
|---|---|
| *G05B 15/02* | (2006.01) |
| *A63F 13/28* | (2014.01) |
| *H02P 31/00* | (2006.01) |
| *H02P 7/285* | (2016.01) |
| *H02P 7/29* | (2016.01) |

(52) U.S. Cl.
CPC .............. *G05B 15/02* (2013.01); *A63F 13/28* (2014.09); *H02P 7/285* (2013.01); *H02P 7/2855* (2013.01); *H02P 31/00* (2013.01); *H02P 7/2913* (2013.01)

(58) Field of Classification Search
CPC ......... G05B 15/02; A63F 13/28; H02P 31/00; H02P 7/2913

USPC ................................................ 318/445, 560
See application file for complete search history.

(56) References Cited

U.S. PATENT DOCUMENTS

| | | | |
|---|---|---|---|
| 2009/0256505 A1 | 10/2009 | Maeda et al. | |
| 2014/0232063 A1* | 8/2014 | Takahashi | A63F 11/00 273/148 R |
| 2014/0361723 A1* | 12/2014 | Matsushita | H02P 7/2913 318/560 |

FOREIGN PATENT DOCUMENTS

JP 2009-261041 A 11/2009

* cited by examiner

*Primary Examiner* — Bickey Dhakal
*Assistant Examiner* — Zemenay T Truneh
(74) *Attorney, Agent, or Firm* — Metrolex IP Law Group, PLLC

(57) ABSTRACT

A motor control device configured to control a motor, includes a first memory; a second memory different from the first memory; a communication interface circuit configured to receive a control command from an external device; a command parser configured to store control information in the first memory and in the second memory when the control command includes control information defining an operation of the motor, and to generate a response signal including the control information stored in the first memory when the control command includes a command for verifying a communication state and transmit the response signal to the external device via the communication interface circuit; a control unit configured to read the control information from the second memory; and a drive signal generator.

7 Claims, 6 Drawing Sheets

| Operation | TR1 | TR2 | TR3 | TR4 |
|---|---|---|---|---|
| Forward, Drive | ON | OFF | OFF | ON |
| Forward, Stop | OFF | OFF | OFF | OFF |
| Reverse, Drive | OFF | ON | ON | OFF |
| Reverse, Stop | OFF | OFF | OFF | OFF |
| Park | OFF | OFF | ON | ON |

| Mode Set Flag | Command Type |
|---|---|
| 00 | Operation Command |
| 01 | Setting Command |
| 10 | Read Status Command |
| 11 | Communication Check Command |

500

MOTOR CONTROL DEVICE AND GAME MACHINE

CROSS REFERENCE TO RELATED APPLICATIONS

This application claims priority from prior Japanese Patent Application No. 2016-158517 filed with the Japan Patent Office on Aug. 12, 2016, the entire contents of which are incorporated herein by reference.

FIELD

The disclosure relates to a motor control device for controlling a motor and a game machine provided with such a motor control device.

BACKGROUND

Various schemes and devices are employed in game machines, e.g., slot and pinball machines to provide presentation effects that appeal to a player's visual and auditory senses, or sense of touch to increase the player's interest in the game. A moving body such as a moving gadget may be provided in a game machine to provide a presentation effect that appeals to a player's visual senses in particular. For instance, a stepping motor may drive this kind of moving body. To achieve a certain presentation effect, a motor control device may displace the moving body by a predetermined amount at a predetermined speed in accordance therewith. The motor control device receives a control command that includes a target speed and target rotation, and the like from the host device, and controls the motor in accordance with the command.

However, the directed speed and the actual rotational speed of the motor may differ. Thus, one technique proposes transmitting the speed of a synchronous motor, and a digital signal pertaining to an input current or an input voltage outside the synchronous motor allowing the speed of the synchronous motor to be sentenced externally, whereby it is possible to control speed fluctuations in the synchronous motor (refer Japanese Patent Publication No. 2009-261041).

TECHNICAL PROBLEM

A game machine uses metal game media such as pinballs and tokens. Additionally, the game machine is configured so that such game media are stored inside the pachinko machine game machine and pass through a predetermined path therein. Consequently, game media frequently come in contact with each other and with the machine components along the path which tends to create static electricity. Therefore, this static electricity is superimposed on a control command transmitted from a host device to the motor control device, making it likely that the static electricity mistakenly becomes a part of control information included in the control command. However, if a portion of the speed command sent to the motor is over written, it tends to be difficult for the device described in patent document 1 to determine externally whether or not this overwriting took place.

One or more embodiments of the present invention provide a motor control device that allows external verification of the details of a control command transmitted thereto.

SUMMARY

An embodiment of the present invention is a motor control device configured to control a motor. The motor control device includes a first memory; a second memory different from the first memory; a communication interface circuit configured to receive a control command from an external device; a command parser configured to store control information in the first memory and in the second memory when the control command includes control information defining an operation of the motor, and to generate a response signal including the control information stored in the first memory when the control command includes a command for verifying a communication state and transmit the response signal to the external device via the communication interface circuit; a control unit configured to read the control information from the second memory and to determine a setting value for the rotation speed of the motor in accordance with the control information read; and a drive signal generator configured to generate a drive signal that causes the motor to rotate in accordance with a setting value for the rotation speed, and to output the drive signal.

The command parser in the motor control device is further configured to generate a second response signal including all or a portion of the control information stored in the second memory when the control command includes a command for verifying the control state of the motor, and to transmit said second response signal to the external device.

The control command including a command for verifying the control state of the motor may further include information specifying a range for reading the control information; and the command parser may be configured to read all or part of the control information included in said range from the second memory and to generate the second response signal including all or part of said control information Another embodiment is a game machine including a main game unit; a moving body arranged on the front surface of the main game unit and configured to move; a motor for driving the moving body; a motor control device configured to control the motor; and a presentation controller configured to control the presentation of an effect in accordance with the state of play. The presentation controller generates a control command including control information that defines an operation of the motor in accordance with the state of play, and transmits the said control command to the motor control device. The motor control device includes a first memory; a second memory different from the first memory; a communication interface circuit configured to receive a control command; a command parser configured to store control information in the first memory and in the second memory when the control command includes control information defining an operation of the motor, and to generate a response signal including the control information stored in the first memory when the control command includes a command for verifying a communication state and transmit the response signal to the presentation controller via the communication interface circuit; a control unit configured to read the control information from the second memory and to determine a setting value for the rotation speed of the motor in accordance with the control information read; and a drive signal generator configured to generate a drive signal that causes the motor to rotate in accordance with a setting value for the rotation speed, and to output the drive signal.

EFFECTS

The motor control device according to one or more embodiments of the invention may allow external verification of the details of a control command transmitted thereto.

DETAILED DESCRIPTION

A motor control device according to embodiments of the present invention is described below with reference to the drawings. The motor control device receives a control command including control information from a host control device, and saves this control information in a register accessible by a controller that calculates a motor speed setting value, and a buffer for reading by an external device. The control information defines operations of the motor such as a target rotation and a target rotation speed for the motor. The host computer sends the motor control device a read command used to check the status of a transmitted signal. On receiving this status check command from the host control device, the motor control device reads the control information stored in the buffer and transmits the same to the host control device; thereby, the contents of a control command transmitted to the motor control device may be verified externally.

In this embodiment, the object controlled by the motor control device is a DC motor. However, the control target of the motor control device is not limited to a DC motor, and maybe a stepping motor or an AC motor.

Figure 1:
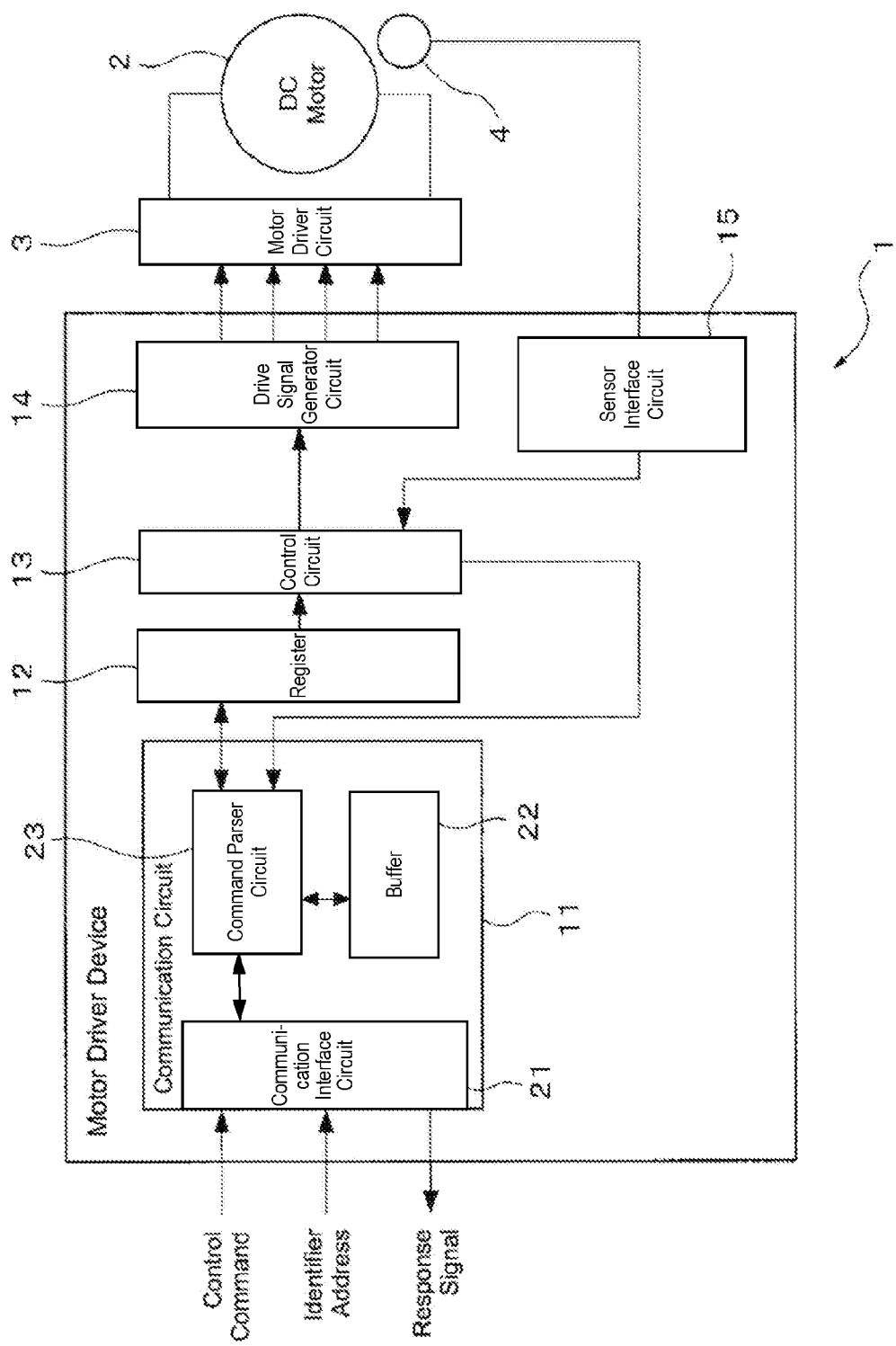
FIG. 1 is a schematic configuration diagram of a motor control device according to one embodiment.

FIG. 1 is a schematic configuration diagram of a motor control device according to one embodiment. As illustrated in FIG. 1, the motor control device 1 includes a communication circuit 11, a register 12, a control circuit 13, a drive signal generator circuit 14, and a sensor interface circuit 15.

Each of the components in the motor control device 1 may be packaged on a circuit board as individual components, or package on a circuit board in an integrated circuit.

The motor control device 1 controls the DC motor 2 in accordance with a control command from the host control device. More specifically, the motor control device 1 causes the DC motor 2 to rotate at a target rotation speed directed by the control command. In the embodiment the motor control device 1 uses pulse width modulation (PWM) to generate a drive signal that switches the current supplied to the DC motor 2 on and off. The motor control device 1 outputs the drive signal generated to a motor driver circuit 3 which supplies the DC motor 2 with current and thereby controls the rotation speed of the DC motor 2. A rotary encoder 4 transmits a detection signal every time the rotation shaft (not shown) of the DC motor 2 enters a predetermined rotation angle; the motor control device 1 receives this detection signal and computes the total rotation since initial rotation of the DC motor. The motor control device 1 can also stop the DC motor 2 when the total rotation thereof reaches the target rotation specified in the control command.

Figure 2:
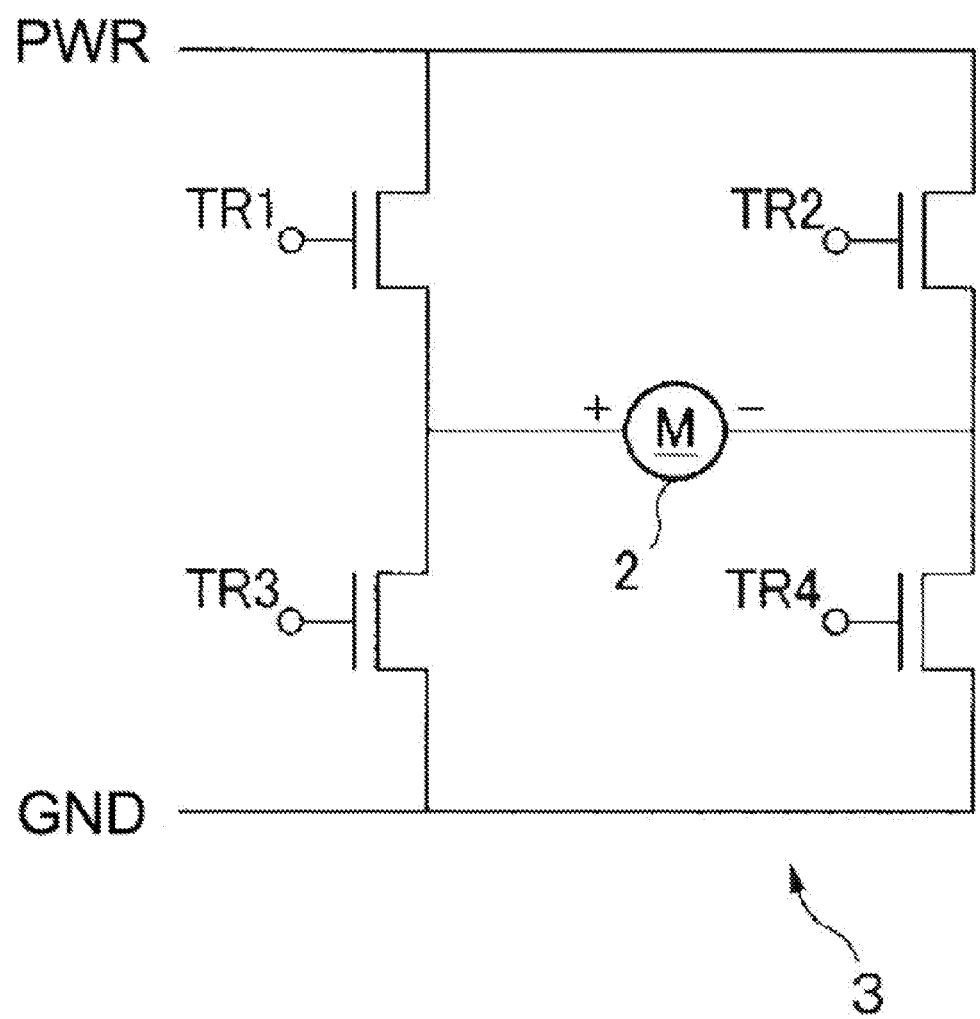
FIG. 2 is a circuit diagram of a motor driver circuit.

FIG. 2 is a circuit diagram of the motor driver circuit 3. The motor driver circuit 3 includes four switches TR1-TR4. Each switch may be for instance a transistor or a field effect transistor. Two of the four switches, specifically switch TR1 and TR3 are connected in series between the power and the ground. The switch TR2 and TR4 are also connected in series between the power and the ground. The positive terminal of the DC motor 2 is connected between the switches TR1 and TR3, whereas the negative terminal of the DC motor 2 is connected between the switches TR2 and TR4. The switch terminals of the switches TR1-TR4 are each connected to the drive signal generator circuit 14; note that if for instance the switches TR1-TR4 are transistors, then the switch terminals are base terminals, and if the switches TR1-TR4 are field effect transistors the switch terminals are gate terminals. The drive signal from the drive signal generator circuit 14 is input to the switch terminals of the switches TR1-TR4.

Figure 3:
FIG. 3 illustrates an example of a table expressing the relationship between a drive signal applied to the switches in the motor driver circuit and the rotation direction of a DC motor.

FIG. 3 illustrates an example of a table expressing the relationship between a drive signal applied to the switches and the rotation direction of a DC motor 2. As illustrated in the table 300, the DC motor 2 may be driven forward by applying a drive signal with a periodic pulse to the switch terminals of the switches TR1 and TR4; here the pulse is established via pulse width modulation and the width of the pulse defines the rotation speed of the DC motor 2. In contrast, no drive signal is applied to the switch terminals for the switches TR2 and TR3. Hereby, an input voltage is supplied to the positive terminal only when the pulse is applied to switch TR1 and switch TR4 in the DC motor 2; therefore the DC motor 2 rotates forward at a speed defined by the pulse width.

Note that the drive signal may be applied to either one of the switches TR1 or TR4, with the other switch always on to drive the DC motor 2 forward.

In contrast, the DC motor 2 may be driven in reverse by applying a drive signal with a periodic pulse to the switch terminals of the switches TR2 and TR3; here the pulse is established via pulse width modulation, and the width of the pulse defines the rotation speed of the DC motor 2. On the other hand, no drive signal is applied to the switch terminals of the switches TR1 and TR4. Hereby, an input voltage is supplied to the negative terminal only when the pulse is applied to switch TR2 and switch TR3 in the DC motor 2; therefore the DC motor 2 rotates in reverse at a speed defined by the pulse width.

Note that, the drive signal may be applied to either one of the switches TR2 or TR3, with the other switch always on to drive the DC motor 2 in reverse.

Additionally, the DC motor 2 may be parked by activating the switch terminals of the switches TR3 and TR4, and deactivating the switch terminals of the switches TR1 and TR2.

The switch terminals for the switches are deactivated when the DC motor 2 is not being driven.

The rotary encoder 4 is one example of a rotation angle sensor, and may be, for instance, an optical rotary encoder. The rotary encoder 4 includes a disk attached to the rotation shaft of the DC motor 2, and a light source and a light receiving element each facing one side of the disk. The disk includes a plurality of slits along the circumference of the disk about the rotation shaft. Each time one of the slits is lands between the light source and the light receiving element, the light from the light source reaches the light receiving element, thereby allowing the rotary encoder 4 to output a pulsating detection signal. The rotary encoder 4 thus outputs a detection signal each time the DC motor 2 rotates to a predetermined angle of rotation. For instance, providing fifty slits along the circumference of the disk about the rotation shaft of the DC motor 2 allows the rotary encoder 4 to output fifty detection signals when the DC motor 2 performs a single rotation.

The components in the motor control device 1 are described below.

The communication circuit 11 includes, for instance, a communication interface circuit 21, a buffer 22, and a command parser circuit 23.

The communication interface circuit 21 is an interface circuit that connects host control device and the motor control device 1. The host control device may be a presentation CPU in the game machine where the motor control device 1 is installed. The communication interface circuit 21 receives a multi-bit control command transmitted serially from the host control device.

The communication interface circuit 21 also receives an identifier address from the host control device that identifies the target of the control command to the motor control device. The communication interface circuit 21 also receives a clock signal from the host control device; the clock signal is for synchronizing each of the plurality of bits included in a control command to allow parsing of the control command. The clock signal may be a square pulse that is a predetermined number of bits within the control command.

On receiving a control command, an identifier address, and a clock signal, the communication interface circuit 21 outputs the same to the command parser circuit 23. The communication interface circuit 21 also transmits a response signal or a command completion signal received from the command parser circuit 23 to the host control device.

The buffer 22 is one example of a first memory, and may be a volatile memory circuit that is readable and writable. The buffer 22 temporarily stores the control information included in a control command. Note that the buffer 22 may store only control information included in a single control command. In this case, the control information previously stored is overwritten each time new control information is written to the memory circuit.

The command parser circuit 23 parses a control command each time a control command is receives from a host control circuit via the communication interface circuit 21. The command parser circuit 23 carries out processing in accordance with the control command.

In the embodiment, there are four types of control commands. The operation command, which is one type of control command, includes operation information that specifies an operation of the DC motor 2, which corresponds to the displacement of the moving body driven by the DC motor 2; for instance, the operation information may include a target rotation and a target rotation speed for the DC motor 2. The setting command, which is another type of control command, includes setup information that defines parameters for the DC motor 2. Note that the operation information and the setup information are examples of control information that define the operation of the motor. The read status command is another type of control command. The read status command requests for all or a portion of the control information stored in the register 12 to be read and sent to the host control device. The last type of control command is a communication check command. The communication check command requests for all or a portion of the control information stored in the buffer 22 to be read and sent to the host control device.

Figure 4:
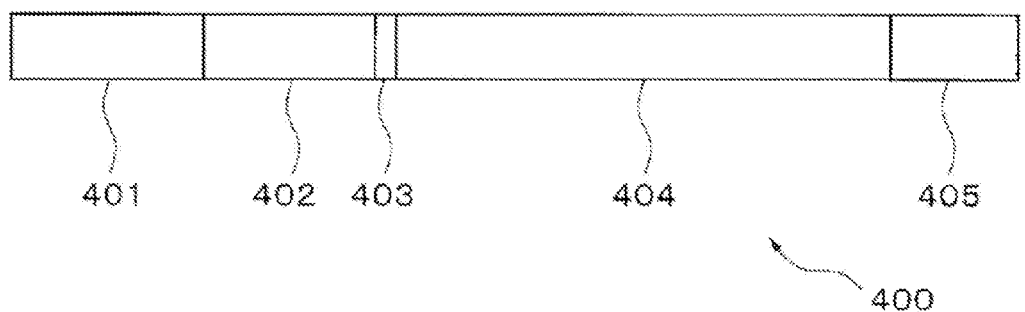
FIG. 4 is an example format for a control command.

FIG. 4 is an example format for a control command; as illustrated in FIG. 4, a control command 400 includes a start flag 401, a device address 402, a mode set flag 403, control data 404, and an end flag 405 in the order from the header. The control command 400 may include a spacer, e.g., a single-bit spacer with a value '0', between adjacent flags, and the address and data.

The start flag 401 is a bit string indicating the start of the control command 400; in the embodiment the start flag 401 is a bit string of nine individual bits with the value of "1". Note that the start flag 401 may be any type of bit string that does not match the other bit strings in the control command 400.

The device address 402 is an identifier address that specifies the motor control device that would be controlled by control command 400; in the embodiment the device address 402 is represented by an 8-bit string. The command parser circuit 23 in the communication circuit 11 determines whether or not the device address 402 matches an identifier address transmitted separately from the host control device; if the addresses match, the command parser circuit 23 determines that the motor control device 1 is a control target for the control command 400.

The mode set flag 403 is a two bit flag representing the type of control command.

Figure 5:
FIG. 5 is a table representing a correspondence relationship between the value of a mode set flag and the type of control command.

FIG. 5 is a table representing a correspondence relationship between the value of a mode set flag and the type of control command. The left-hand column in the table 500 enumerates all possible two-bit values of the mode set flag 403; the right-hand column of the table 500 lists the type of control command associated with the combination of bits in the mode set flag 403 listed in the adjacent left-hand column.

In the embodiment, a mode set flag with a value of "00" indicates that the control command is an operation command that includes operation information. A mode set flag with a value of "01" indicates that the control command is setting command that includes setup information. A mode set flag with a value of "10" indicates that the control command is read status command. Finally, a mode set flag with a value of "11" indicates that the control command is communication check command.

The command parser circuit 23 references the value of the mode set flag 403, identifies the type of control command, and carries out processing in accordance with the type of control command. The processes in the command parser circuit 23 is described later in detail.

The control data 404 includes operation information for the DC motor 2 controlled by the motor control device 1 when the control command is an operation command. For example, the control data 404 may include data indicating the rotation direction, data indicating a target rotation speed, and data indicating a target rotation. When the control command is a setting command, the control data 404 may include a flag that indicates whether or not to halt the current operation of the DC motor, data representing the speed domain, and data representing the angular resolution of the DC motor 2 detected by the rotary encoder 4.

The control data 404 may include address designation information specifying an address in the register 12 to be read when the command control command is a read status command. For instance, the address designation information may be a bit string of predetermined length occupying a predetermined position in the control data 404. The values in the bit string making up the address designation information may thus specify the range of control information to be read. The address designation information specifies any of the addresses storing: all or a part of the operation information for a currently executed operation command; all or part of setup information relating to a currently executed operation command is stored; all or part of the operation information for an operation command on standby (i.e., to be executed next); the current position of the DC motor 2; and an address corresponding to where all the control information is stored in the register 12.

The end flag 405 is a bit string indicating where the control command 400 ends. The end flag 405 may be any bit string that does not match the start flag and other bit strings included in the control command.

The command parser circuit 23 compares the identifier address and the device address included in the control command. When the identifier address and the device address do not match, the control command received is not intended for the motor control device 1; therefore, the command parser circuit 23 destroys the control command. In contrast, when the identifier address and the device address match, the command parser circuit 23 determines that the motor control device 1 if the intended target for the control command. The command parser circuit 23 carries out processing in accordance with the type of control command.

Note that the command parser circuit 23 may store the identifier address in a memory circuits, so that the command parser circuit 23 can determine whether or not an identifier address and a device address match even if the identifier address and the control command are received at different times.

If the control command is an operation command or a setting command, the command parser circuit 23 writes the control information included in the control commands into the register 12 and in the buffer 22. On the other hand, if the control command is a read status command, the command parser circuit 23 references the address designation information included in the control data, and reads all or a part of the control information from the register 12 to identify the read address. The command parser circuit 23 then reads the control information stored in the register 12 at the identified address, and generates a response signal (second response signal) that includes the control information read. The response signal may include information identifying the destination for the response signal, for instance the address of the host control device. The response signal may also include information identifying the motor control device 1, such as the identifier address of the motor control device 1.

If the control command includes a communication check command, the command parser circuit 23 reads the control information stored in the buffer 22 and generates a response signal including the control information. The response signal may also include information identifying the destination for the response signal, such as the address of the host control device in this case. The response signal may also include information identifying the motor control device 1, such as the identifier address of the motor control device 1.

Once the command parser circuit 23 generates the response signal, the command parser circuit 23 transmits that response signal to the host control device via the communication interface circuit 21.

The command parser circuit 23 may generate a command complete signal pertaining to the DC motor 2 controlled by the motor control device 1 when and operation command stored in the register 12 is being executed and transmit the command complete signal to the host control device via the communication interface circuit 21. That is, the command parser 23 may generate the command complete signal indicating that execution of an operation command is complete when, for instance, the DC motor 2 rotates by the target rotation included in the operation command and transmit the signal to the host control device.

The register 12 is one example second memory, and is a memory circuit with the storage capacity to store at least one set of setup information and operation information for the DC motor 2. The memory circuit included in the register 12 is made up of volatile semiconductor memory circuits that are readable and writable. The register 12 stores the setup information and operation information written from the communication circuit 11. Once the control circuit 13 reads the setup information and the operation information the register 12 may erase this setup information and operation information. The register 12 may also store information indicating the current position of a movable element driven by the DC motor 2, such as the rotation of the DC motor 2 from one end in the moving range of the movable element.

On receiving a request from the command parser circuit 23 in the communication circuit 11, the register 12 reads the control information stored at the address included in the request and output the control information to the command parser circuit 23.

The control circuit 13 may include for instance, a processor and a non-volatile memory circuit. The control circuit 13 may reference the operation information and the setup information read from the register 12 and determine the rotation direction of the DC motor 2. The control circuit 13 may also determine a duty cycle for the drive signal on the basis of the operation information and the setup information. At that point, for instance the control circuit 13 may determine a duty cycle corresponding to a target rotation speed by referencing a speed table preliminarily stored in the memory circuit. The speed table represents the correspondence relationship between the target rotation speed value and the duty cycle. Note that the duty cycle is merely one example of a setting value for the speed of the DC motor 2. The control circuit 13 may notify the drive signal generator circuit 14 of a rotation direction and a duty cycle.

Additionally, each time an operation command is executed the control circuit 13 may count the number of detection signals received from the rotary encoder 4 after the DC motor 2 begins to rotate due to execution of the operation command and use the total of the detection signals receives as the total rotation of the DC motor 2. The control circuit 13 may write this total rotation (i.e., the current position of the DC motor 2) to the register 12.

The control circuit 13 computes the difference between the target rotation included in the operation command and the total rotation each time the total rotation of the DC motor 2 is updated to determine the remaining rotation. The control circuit 13 adjusts the duty cycle on the basis of the remaining rotation so that the DC motor 2 stops rotating when the DC motor 2 reaches the target rotation specified in the operation command. For example, when the remaining rotation falls below a predetermined value, the control circuit 13 reduces the duty cycle by as much of the reduction in the remaining rotation. The control circuit 13 is configured so that the duty cycle equals zero the moment the road remaining rotation is zero.

The control circuit 13 alerts the command parser circuit 23 in the communication circuit 11 that the execution of the operation command is complete when the total rotation reaches the target rotation. The control circuit 13 then removes the control information pertaining to the completed operation command from the register 12.

The drive signal generator circuit 14 includes a variable pulse generator circuits, and a switching circuit. The variable pulse generator circuit changes the width of the pulse output, and the switching circuit changes to which switch in the motor driver circuit 3 a drive signal which is a periodic pulse signal generated by the variable pulse generator circuit is output. The drive signal generator circuit 14 generates a drive signal for driving the DC motor 2 using pulse width modulation in accordance with the duty cycle sent by the control circuit 13 and outputs the drive signal to one of the switches in the motor driver circuit 3. One cycle of the drive signal may be 50 µs. For instance, when the control circuit 13 provides a notification that the rotation direction is the forward direction, the drive signal generator circuit 14 outputs a periodic pulse signal to the switches TR1 and TR4 in the motor driver circuit 3. Whereas, when the control circuit 13 provides a notification that the rotation direction is the reverse direction, the drive signal generator circuit 14 outputs a periodic pulse signal to the switches TR2 and TR3 in the motor driver circuit 3.

The sensor interface circuit 15 receives detection signals from the rotary encoder 4. The sensor interface circuit 15 outputs a detection signal to the control circuit 13 each time a detection signal is received.

As above described, the motor control device stores control information included in a control command in a register accessible to a control circuit and a buffer provided separately thereto. The motor control device, on receiving a communication check command for verifying a communication state reads the control information from the buffer and transmits the same to a host control device. Therefore, the host control device can verify whether or not a control command sent to the motor control device was properly transmitted to the motor control device. More specifically, the control information stored in the buffer remains in the buffer even if the operation command pertaining to the control information is already executed so long as a new control command including control information is not received by the motor control device. Therefore, the motor control device can generate a response signal that includes the control information even after an execution of an operation command related to the control information in the buffer; and thus, the host control device is able to verify whether or not the control command sent to the motor control device was properly transmitted regardless of the execution state of the operation command. Moreover, on receiving a status check command, the motor control device transmits all or part of the control information stored in the register to the host control device; therefore, the motor control device can also send control information other than the control information transmitted immediately prior with a control command to the host control device. Therefore, the host control device can confirm the control status of the motor control device.

The present invention is not limited to the above-described embodiments. For instance, a single control command may include both operation information and setup information.

The controlled object may be a stepping motor; in this case, the control circuit 13 may still obtain a total rotation for the motor even without receiving a signal from a sensor that senses the rotation angle of the motor such as a rotary encoder. The sensor interface circuit 15 may be excluded when there is no rotary encoder.

In other modification examples, the motor control device may include the same number of drive signal generator circuits 14 as a number of motor is being controlled in order to support controlling a plurality of motors. In this case, a control command may include a flag that designates the motor that is the controlled object. The control circuit 13 may notify the drive signal generator circuit 14 that drives the motor identified by the flag of the duty cycle and the rotation direction when the control information is read from the register. The buffer 22 in the communication circuit 11 may also store new control information for each motor. The flag for identifying the motor being controlled they also be included in the communication check command. The command parser circuit 23 in the communication circuit 11 they reference the flag used for identifying the motor being controlled included in a communication check command, read the control information pertaining to the motor identified by the flag from the buffer 22 and generate a response signal.

A motor control device according to any of the above embodiments or modification examples may be mounted in a game machines such as a pinball machine or a slot machine.

Figure 6:
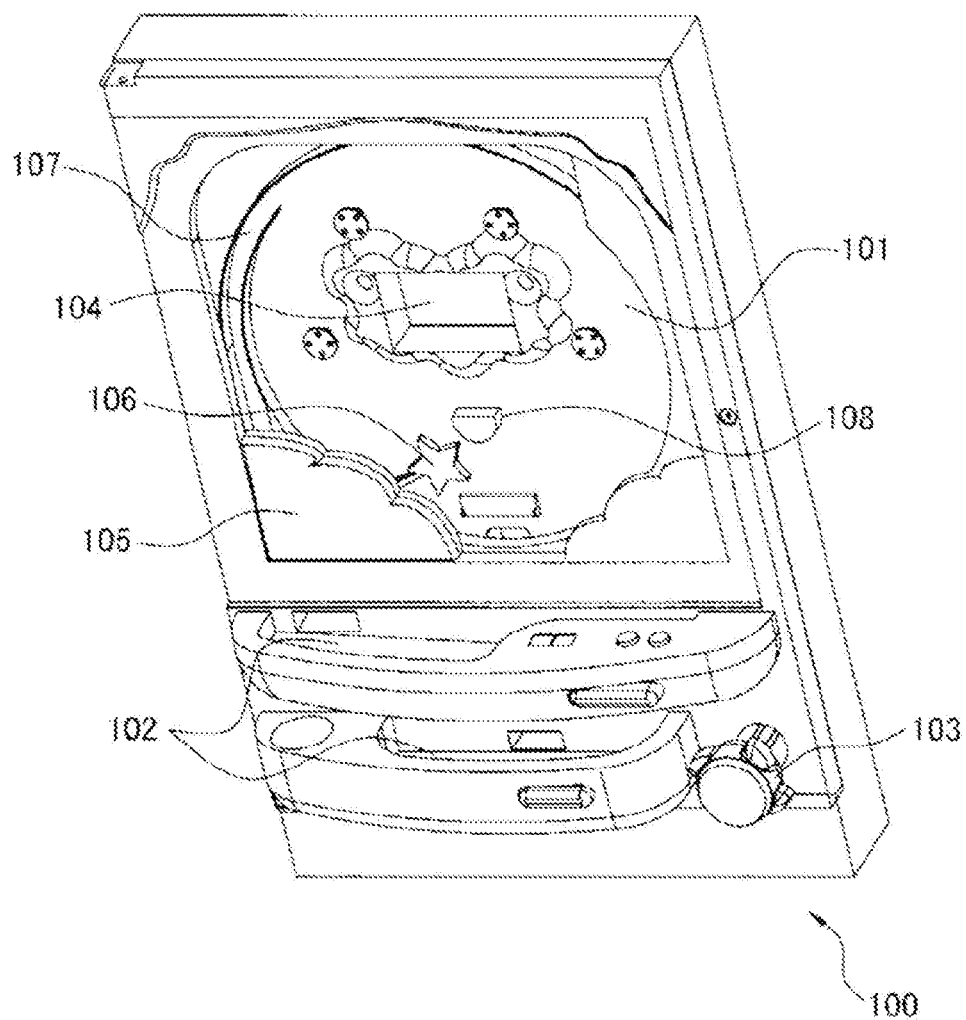
FIG. 6 is a schematic perspective view of a pinball machine provided with a motor control device according to an embodiment and a modification example.
Figure 7:
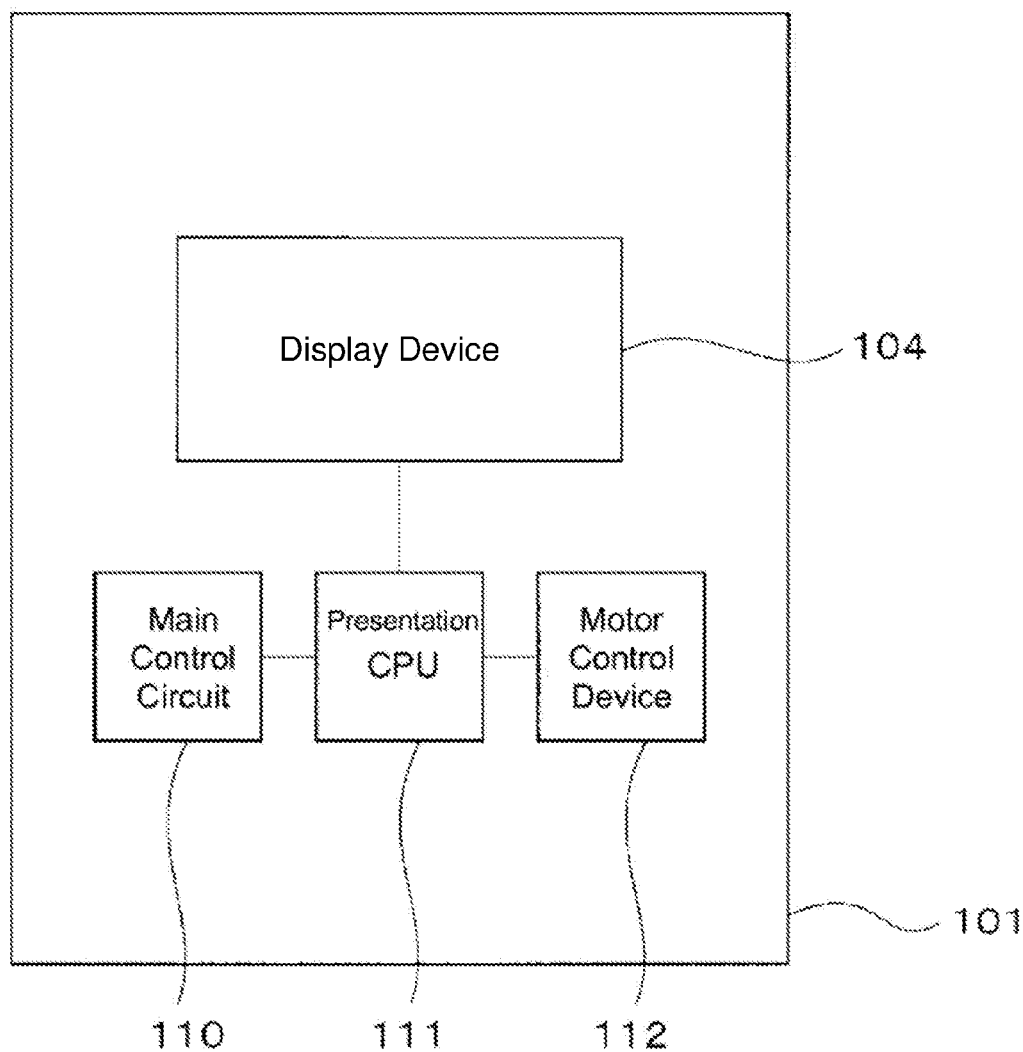
FIG. 7 is an internal schematic view of a pinball machine provided with a motor control device according to an embodiment and a modification example.

FIG. 6 is a schematic perspective view of a pinball machine provided with a motor control device according the above embodiments and modification examples; and FIG. 7 is an internal schematic view of a pinball machine 100. As illustrated in FIG. 6, a pinball machine 100 includes a playfield 101 which is the main game unit. The playfield 101 is where play takes place and takes up a majority of the machine, from the top portion to the center. The pinball machine 100 also includes a ball trough 102 arranged below the playfield 101, an input unit 103 provided with a jog; and a liquid crystal display provided at roughly the center of the playfield 101.

To aid in presenting the game, the pinball machine 100 includes a stationary gadget 105 arranged on the front surface of the play field 101, at the lower part thereof and a moving gadget 106 arranged between the playfield 101 and the stationary gadget 105. The playfield 101 includes rails 107 positioned at the sides. The playfield 101 may also include multiple obstacle pins (not shown) and at least one prize target 108.

The input unit 103 launches the pinball at a predetermined force via a launcher (not shown) in accordance with the amount of rotation of the jog by a player. A launched pinball travels upward along the rails 107 and falls between the multiple obstacle pins. When a sensor (not shown) detects that a pinball has entered any of the prize targets 108, a main control circuit 110 (controller) provided inside of the playfield 101 pays out a predetermined number of pinballs depending on the prize into the ball trough 102 via a payout device (not shown). The main control circuit 110 causes the display device 104 to show various moving images via a presentation CPU 111 provided inside the playfield 101.

The moving gadget 106 is one example of a moving element that moves in accordance with the state of play and that is driven by the DC motor (not shown) controlled by the motor control device 112 according to embodiments and modification examples of the present invention.

The presentation CPU 111 determines the target coordinates and movement speed of the moving gadget 106 on the basis of a state signal indicating the state of play transmitted thereto by the main control circuit 110; herewith the presentation CPU 111 then generates a control command. The presentation CPU 111 outputs the generated control command to the motor control device 112. For instance, before the pinball enters a price target 108, the presentation CPU 111 may generate a control command that hides the moving gadget 106 behind the stationary gadget 105. More specifically, the presentation CPU 111 may generate a control command specifying a target rotation for the rotation of the DC motor that corresponds to a movement distance from the current position of the moving gadget 106 to the lower left end part of the moving gadget's movement range; the presentation CPU 111 then transmits the control command generated to the motor control device 112. In contrast, the main control circuit 110 may input a signal into the presentation CPU 111 indicating when it is detected that a pinball entered the prize target. On receiving this signal the presentation CPU 111 generates a control command specifying a target rotation for a rotation of the DC motor that corresponds to a movement distance from the current position of the moving gadget 106 to the upper right end of the movement range of the moving gadget 106, and sends the control command to the motor control device 112.

The presentation CPU 111 may send the motor control device 112 a communication check command or a read status command at fixed intervals or at predetermined times while no game is in play.

The motor control device 112 is a motor control device according to the above-mentioned embodiments and modification examples. The motor control device 112 controls the DC motor on the basis of a control command received from the presentation CPU 111 and a detection signal received from a rotary encoder (not shown), so that the DC motor rotates at a target rotation speed (i.e., where the moving gadget 106 moves at a speed in accordance with the target rotation speed) and stops at a target rotation (i.e., where the moving gadget 106 reaches the desired location). Hereby, the moving gadget 106 can be moved precisely to a desired destination in accordance with the presentation effects.

A person having ordinary skill in the art may make various modifications in the above manner within the scope of the invention in accordance with how the device will be used.

The invention claimed is:

1. A motor control device configured to control a motor, the motor control device comprising:
   a first memory;
   a second memory different from the first memory;
   a communication interface circuit configured to receive a control command from an external device;
   a command parser circuit configured to:
      store control information included in the control command, the control information stored in each of the first memory and the second memory in response to the control information defining an operation of the motor;
      generate a first response signal comprising the control information stored in the first memory in response to the control command comprising a command for verifying a communication state;
      transmit the first response signal to the external device via the communication interface circuit;
      generate a second response signal comprising all or a portion of the control information stored in the second memory in response to the control command comprising a command for verifying a control state of the motor; and
      transmit the second response signal to the external device via the communication interface circuit; and
   a control circuit comprising a processor configured with instructions to perform operations comprising:
      reading the control information from the second memory; and
      determining a setting value for a rotation speed of the motor in accordance with the control information read from the second memory; and
   a drive signal generator circuit configured to generate a drive signal that causes the motor to rotate in accordance with the setting value for the rotation speed, and to output the drive signal to the motor.

2. The motor control device according to claim 1, wherein the control command comprises a command for verifying the control state of the motor and information specifying a range for reading the control information; and
   the command parser circuit is configured to read all or part of the control information included in the specified range from the second memory and to generate the second response signal comprising all or part of the control information read from the second memory.

3. The motor control device according to claim 1, wherein the first memory comprises a buffer, and the second memory comprises a register.

4. The motor control device according to claim 1, further comprising a communication circuit, wherein the communication circuit comprises the communication interface circuit, the command parser circuit, and the first memory, and wherein the second memory is provided outside of the communication circuit.

5. A game machine comprising:
   a main game unit;
   a moving body arranged on a front surface of the main game unit and configured to move;
   a motor for driving the moving body;
   a motor control device configured to control the motor; and
   a presentation controller configured to control a presentation of an effect in accordance with a state of play; wherein
   the presentation controller generates a control command comprising control information that defines an operation of the motor in accordance with the state of play, and transmits the control command to the motor control device;
   the motor control device including comprises:
      a first memory;
      a second memory different from the first memory;
      a communication interface circuit configured to receive the control command;
      a command parser circuit configured to:
         in response to the control command comprising the control information defining the operation of the motor, store the control information in each of the first memory and the second memory;
         generate a first response signal including the control information stored in the first memory when the control command includes a command for verifying a communication state;
         transmit the first response signal to the presentation controller via the communication interface circuit;
         generate a second response signal comprising all or a portion of the control information stored in the second memory in response to the control command comprising a command for verifying a control state of the motor; and
         transmit the second response signal to the presentation controller via the communication interface circuit; and
      a control circuit comprising a processor configured with instructions to perform operations comprising:
         reading the control information from the second memory; and determining a setting value for a rotation speed of the motor in accordance with the control information read from the second memory; and a drive signal generator configured to generate a drive signal that causes the motor to rotate in accordance with the setting value for the rotation speed, and to output the drive signal to the motor.

6. The game machine according to claim 5, wherein the first memory comprises a buffer, and the second memory comprises a register.

7. The game machine according to claim 5, further comprising a communication circuit, wherein the communication circuit comprises the communication interface circuit, the command parser circuit, and the first memory, and wherein the second memory is provided outside of the communication circuit.

\* \* \* \* \*